(12) United States Patent
Pelekhaty

(10) Patent No.: US 6,844,977 B2
(45) Date of Patent: Jan. 18, 2005

(54) MULTI-CHANNEL OPTICAL FILTER

(75) Inventor: Vladimir Pelekhaty, Baltimore, MD (US)

(73) Assignee: Ciena Corporation, Linthicum, MD (US)

(*) Notice: Subject to any disclaimer, the term of this patent is extended or adjusted under 35 U.S.C. 154(b) by 0 days.

(21) Appl. No.: 10/056,721

(22) Filed: Jan. 25, 2002

(65) Prior Publication Data

US 2002/0131176 A1 Sep. 19, 2002

Related U.S. Application Data

(60) Provisional application No. 60/264,334, filed on Jan. 26, 2001.

(51) Int. Cl.[7] ............................................ G02B 5/28
(52) U.S. Cl. ............... 359/589; 359/590; 359/586; 359/580
(58) Field of Search .................... 359/124, 127, 359/128, 129, 130, 131, 577, 580, 586, 588, 589, 590; 385/37

(56) References Cited

U.S. PATENT DOCUMENTS

| | | | |
|---|---|---|---|
| 4,047,805 A | | 9/1977 | Sekimura .................... 355/589 |
| 4,747,666 A | | 5/1988 | Ishida ........................ 359/588 |
| 5,726,784 A | * | 3/1998 | Alexander et al. .......... 359/125 |
| 6,011,652 A | | 1/2000 | Cushing ...................... 359/588 |
| 6,069,719 A | * | 5/2000 | Mizrahi ....................... 359/124 |
| 6,459,516 B1 | * | 10/2002 | Mizrahi et al. ............. 359/127 |
| 6,466,346 B1 | * | 10/2002 | Mizrahi et al. ............. 359/130 |

FOREIGN PATENT DOCUMENTS

| | | |
|---|---|---|
| EP | 0 916973 | 5/1999 |
| WO | 0 036811 | 7/1999 |
| WO | 0 063728 | 10/2000 |

\* cited by examiner

*Primary Examiner*—Drew A. Dunn
*Assistant Examiner*—Joshua L. Pritchett
(74) *Attorney, Agent, or Firm*—Michael R. Cammarata; David L. Soltz

(57) ABSTRACT

An exemplary embodiment of the invention is an optical filter including a mirror including a plurality of first dielectric layers having a first index of refraction and a plurality of second dielectric layers having a second index of refraction. A plurality of the first dielectric layers have an integer quarter wave optical thickness and at least one of the first dielectric layers has a non-integer quarter wave optical thickness. A plurality of the second dielectric layers have an integer quarter wave optical thickness and at least one of the second dielectric layers has a non-integer quarter wave optical thickness. In an exemplary embodiment, the non-integer quarter wave optical thickness first layer and the non-integer quarter wave optical thickness second layer are determined so as to enhance transmission at a predetermined wavelength.

13 Claims, 12 Drawing Sheets

MULTI-CHANNEL OPTICAL FILTER

CROSS REFERENCE TO RELATED APPLICATION

The present application claims the benefit of the filing date of U.S. Provisional Application No. 60/264,334, filed Jan. 26, 2001, the teachings of which are incorporated herein by reference.

BACKGROUND OF THE INVENTION

1. Field of Invention

The invention relates generally to optical filters and more particularly to an optical interference filter for transmitting a plurality of optical channels.

2. Description of Related Art

Optical interference filters rely on principles of interference that modify the intensities of the reflected light incident upon a surface. A familiar example of such interference is the colors created when light reflects from a thin layer of oil floating on water. Briefly stated, by modifying the interface of a substance and its environment with a third material, the reflectivity of the substance can be significantly altered. This principle is used in the fabrication of optical interference filters. These filters can be used as one of, or as the main filtering element in optical add/drop multiplexers employed in optical communication systems in order to select one or more channels from a transmission signal.

In its simplest form, an optical interference filter includes a cavity which is comprised of two partial reflectors (or mirrors) separated by a spacer. Each partial reflector, also referred to as a quarter-wave stack, is typically constructed by depositing alternating layers of high and low refractive index dielectric materials upon a substrate where each layer has an optical thickness of one quarter (or an odd integer multiple thereof) of the desired wavelength, $\lambda_0$, of the filter, i.e. $\lambda_0/4$. The optical thickness is defined as the physical thickness of the layer multiplied by the refractive index of the material. The spacer is typically a layer of low refractive index material (e.g., $SiO_2$) having an optical thickness of $\lambda_0/2$, or a multiple half-wave. Exemplary high and low refractive index dielectric materials are $TiO_2$, $Ta_2O_5$ and $SiO_2$, respectively. An interference filter has an associated transmission characteristic which is a function of the reflectance of the layers of high and low index materials associated with the stack.

In many applications, optical interference filters are constructed using multiple cavities. Typically, cavities are deposited on top of other cavities, with a quarter-wave layer of low index material therebetween. Multicavity filters produce transmission spectra that are preferred in optical communication systems where steep slopes and square passbands are needed to select or pass one or more wavelengths. In optical communications systems, a plurality of wavelengths may be used to carry a signal with each wavelength being referred to as an optical channel.

FIG. 1 illustrates an exemplary transmission spectrum for a mirror comprising a plurality of high/low refractive index dielectric layers. The mirror exhibits high reflectivity over a stopband centered at $\lambda_0$ and rippled sidelobes including points A, B and C.

FIG. 2 is an exemplary transmission spectrum for a single cavity optical interference filter utilizing a pair of quarter-wave stacks each having the transmission spectrum shown in FIG. 1. As can be seen in FIG. 2 the transmission response is acceptable at wavelength $\lambda_0$ (approximately 1550 nm). However, the response at wavelength $\lambda_1$ (approximately 1310 nm) falls on the sidelobe and/or within the ripple band of the transmission spectrum, thereby making transmission of a particular wavelength in this range unreliable. Thus, transmission at a first wavelength $\lambda_0$ may be reliable while transmission for wavelength $\lambda_1$ within the ripple band or sidelobe slope are subject to variations in the transmission characteristic.

As noted above, optical systems can utilize one or more interference filters to select particular channels from a transmission signal. For example, a first filter may be used to select a payload channel associated with voice and/or data transmission in the 1.5 μm range and a second filter is used to select a service channel in the 1.31 μm or 1.6 μm range which carries system level and/or network monitoring information. The use of two separate filters, however, has several disadvantages. First, it increases overall system cost since it requires the manufacture and installation of two individual components. Secondly, optical networks typically have a predetermined loss budget, which, if exceeded, can compromise signal integrity. Each component, in this case an optical filter, contributes some loss to the overall network. By using two separate filters to select a payload channel and a service channel, each filter impacts a network's loss budget in a negative fashion.

The loss associated with individual filters is further compounded in wave division multiplexing (WDM) systems where the payload is delivered on a plurality of wavelengths and accompanied by a service channel on a separate wavelength. For example, in a six channel WDM system, seven filters are needed (six for payload and one for service channel) for both add and drop capability. This results in a total of fourteen filters greatly increasing loss to the network.

Thus, there is a need for a filtering element used with optical communication systems which is capable of selecting a plurality of optical passbands. There is a further need to provide such a filtering element which reliably selects at least one wavelength corresponding to a payload channel as well as a wavelength corresponding to a service channel within an optical network.

SUMMARY OF THE INVENTION

An exemplary embodiment of the invention is an optical filter including a mirror including a plurality of first dielectric layers having a first index of refraction and a plurality of second dielectric layers having a second index of refraction. A plurality of the first dielectric layers have an integer quarter wave optical thickness and at least one of the first dielectric layers has a non-integer quarter wave optical thickness. A plurality of the second dielectric layers have an integer quarter wave optical thickness and at least one of the second dielectric layers has a non-integer quarter wave optical thickness. In an exemplary embodiment, the non-integer quarter wave optical thickness first layer and the non-integer quarter wave optical thickness second layer are determined so as to enhance transmission at a predetermined wavelength.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and are not to be construed as limiting the present invention, and wherein.

DETAILED DESCRIPTION OF INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

An interference filter may transmit a narrow ($\approx 1$ nm wide) wavelength band around a first center wavelength $\lambda_0$ (e.g., $\lambda_0 \approx 1550$ nm) along with a broader ($\approx 20$ nm wide) wavelength band around a second center wavelength $\lambda_1$, (e.g., $\lambda_1 \approx 1310$ nm). To accomplish that, the interference filter may be constructed using multiplayer dielectric mirrors having high reflectivity at $\lambda_0$ and high transmission at $\lambda_1$. Conventional stacks of quarterwave dielectric layers may have their high transmission peaks (referenced at points A and B in FIG. 1) are positioned within the passband of the multilayer dielectric mirror corresponding to wavelength $\lambda_1$ which is the center wavelength of the second broad band. If the first high transmission peak is chosen to coincide with $\lambda_1$ (i.e., peak referenced at A) the following equations can be used to determine the physical parameters of the basic multilayer dielectric mirror:

$$\frac{n_H(\lambda_1)}{n_L(\lambda_1)} = \frac{1+r}{1-r} \quad (1)$$

$$r = \sqrt{1 - \left(\frac{\sin\left(\frac{\pi}{2}\frac{\lambda_0}{\lambda_1}\right)}{\sin\left(\frac{\pi}{2}\frac{(q-1)}{(q+1)}\right)}\right)^2} \quad (2)$$

where $n_H(\lambda_1)$ and $n_L(\lambda_1)$ are high and low refractive indices at $\lambda_1$; r is the absolute value of the magnitude Fresnel reflection coefficient for the boundary between the high and low index layers; and q is the number of layers in the stack or mirror. Equations (1) and (2) can be satisfied, for example, with $n_H(\lambda_1) \approx 2.05$ ($Ta_5O_5$), $n_L(\lambda_1) \approx 1.44$ ($SiO_2$), $\lambda_0 = 1550$ nm, $\lambda_1 = 1310$ nm, and q=13. In this manner, for a wavelength $\lambda_0$ ($\approx 1550$ nm), broadband transmission is achieved for a wavelength centered at $\lambda_1$ ($\approx 1310$ nm) as well as narrow band transmission at wavelength $\lambda_0$.

Figure 3A:
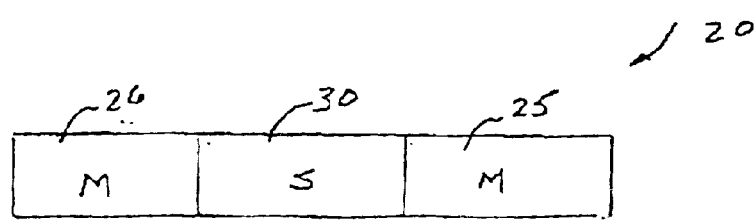
FIG. 3(a) illustrates a single-cavity interference filter.
Figure 3B:
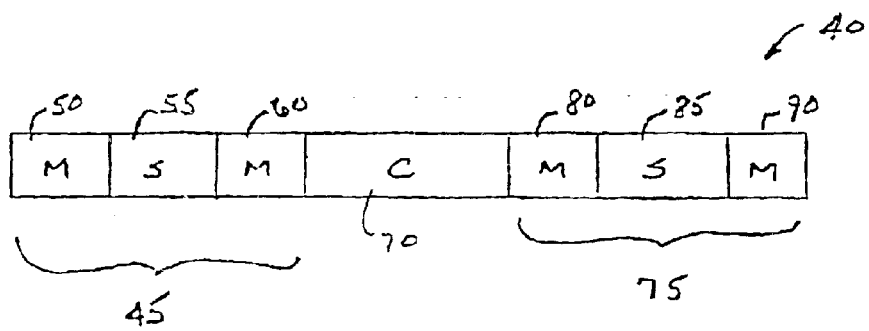
FIG. 3(b) illustrates a dual-cavity interference filter.
Figure 3C:
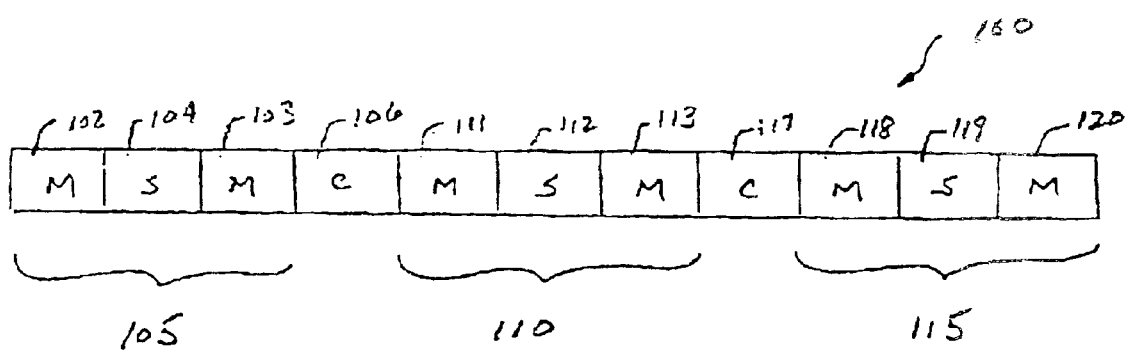
FIG. 3(c) illustrates a triple-cavity interference filter.

FIG. 3(a) depicts a single-cavity interference filter 20 comprising a spacer 30 interposed between a first and second mirrors 25 and 26. FIG. 3(b) depicts a dual-cavity interference filter 40 having a coupling layer 70 interposed between a first cavity 45 and a second cavity 75. Coupling layer 70 can be, for example, a low index material having a quarter wave optical thickness. First cavity 45 includes mirrors 50 and 60 separated by spacer 55. Second cavity 75 includes mirrors 80 and 90 separated by spacer 85. Similarly, FIG. 3(c) depicts a triple-cavity interference filter 100 having a first cavity 105, a second cavity 110 and a third cavity 115. First coupling layer 106 is positioned between first cavity 105 and second cavity 110. Second coupling layer 117 is positioned between second cavity 110 and third cavity 115. First cavity 105 comprises mirrors 102 and 103 separated by spacer 104. Second cavity 110 includes mirrors 111 and 113 separated by spacer 112. Third cavity 115 includes mirrors 118 and 120 separated by spacer 119.

Figure 4:
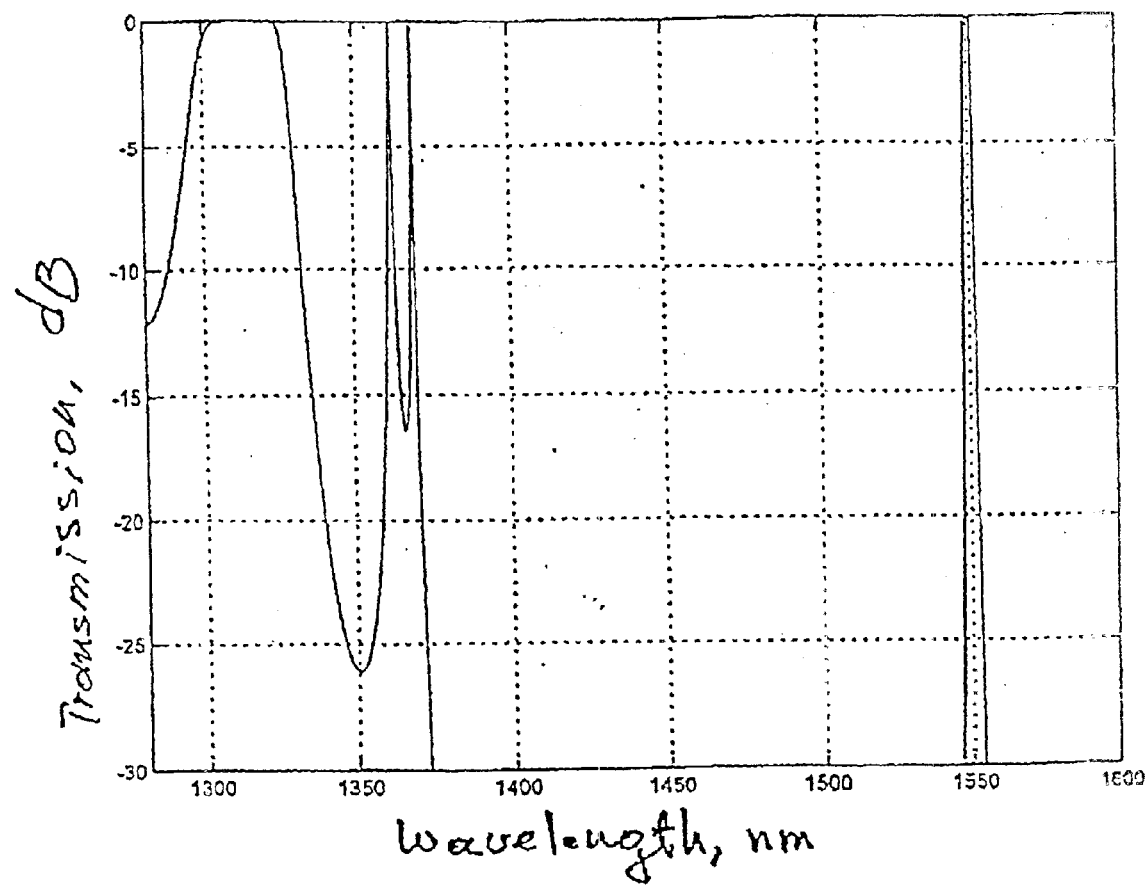
FIG. 4 illustrates a transmission characteristic of an exemplary triple-cavity interference filter having a narrow transmission band at a wavelength around 1550 nm and a broad transmission band at a wavelength around 1310 nm.

FIG. 4 illustrates a transmission characteristic of an exemplary triple-cavity interference filter having a narrow transmission band at wavelength $\lambda_0$ (around 1550 nm) and a broad transmission band at wavelength $\lambda_1$ (around 1310 nm).

The interference filter described above with respect to FIG. 3c transmits both a narrow band centered at wavelength $\lambda_0$ ($\approx 1550$ nm) and a broad band at wavelength $\lambda_1$ ($\approx 1310$ nm). However, this embodiment transmits the bands for a particular wavelength $\lambda_0$. If a different wavelength, for example $\lambda_0 \pm \Delta$, is selected within the ITU channel grid and the gain band of an erbium doped fiber amplifier (1530–1570 nm), the broad transmission band centered around $\lambda_1$ would shift from 1310 nm proportionally with $\Delta$, the difference between $\lambda_0$ and 1550 nm. The broad transmission band centered around $\lambda_1$ (for example, 1310 nm) can be maintained for different values of $\lambda_0$, if the high transmission region in the pass band of the multilayer dielectric mirror is greater than 20 nm, which is sufficient to provide the dual band characteristics for a fixed pair of $\lambda_0$ and $\lambda_1$.

Figure 1:
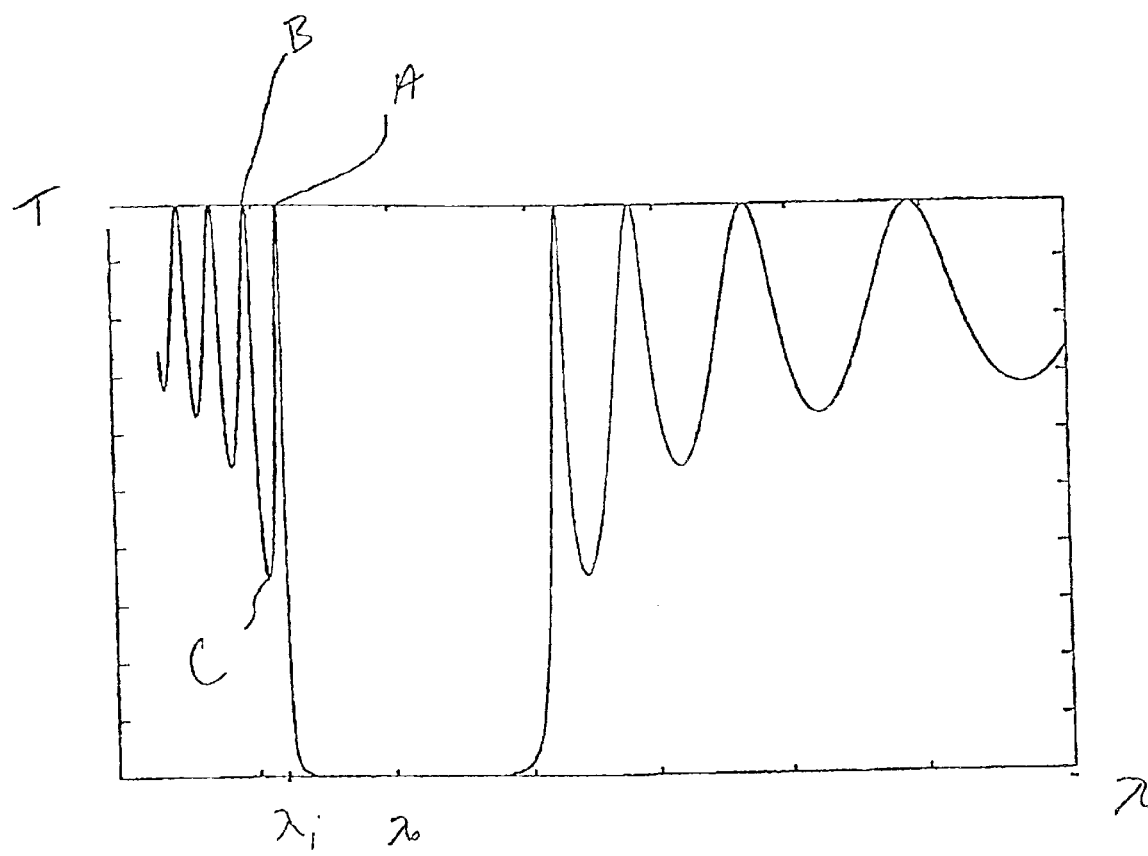
FIG. 1 illustrates a transmission spectrum of a conventional mirror including a plurality of dielectric layers.
Figure 2:
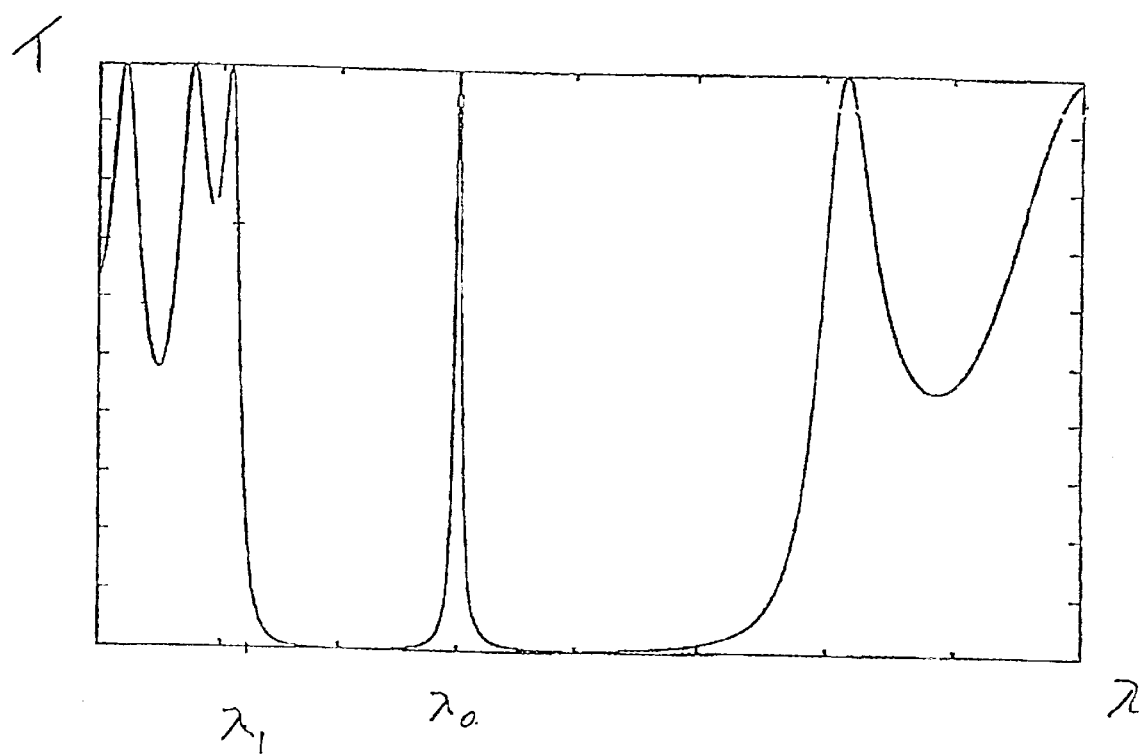
FIG. 2 illustrates a transmission spectrum of a single cavity filter including conventional mirrors.
Figure 5:
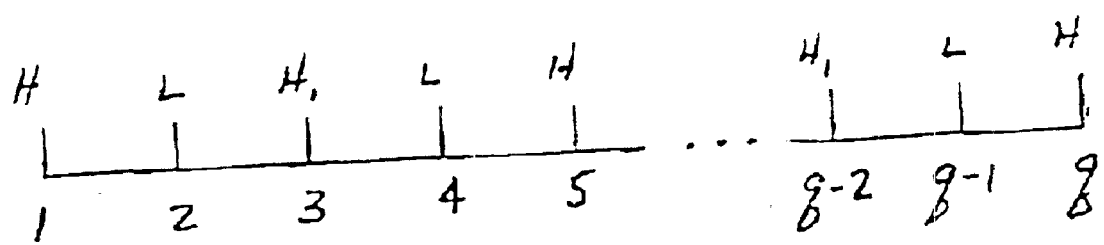
FIG. 5 illustrates schematically a mirror having q dielectric layers of alternating high and low refractive indices.
Figure 6:
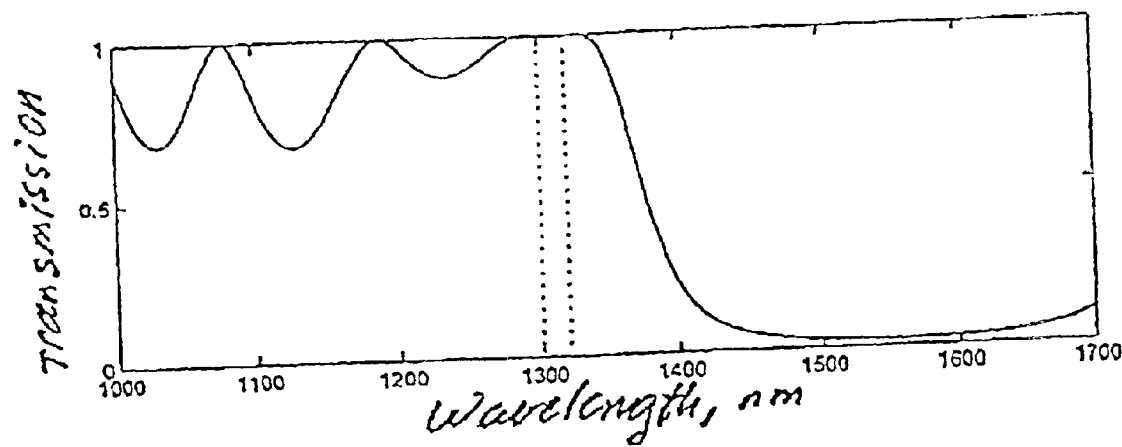
FIG. 6 illustrates a transmission characteristic associated with the mirror shown in FIG. 5.

To accommodate for this shift, the high transmission band around wavelength $\lambda_1$ can be broadened. In particular, the dielectric mirrors with the broader high transmission band around $\lambda_1$ should be used. Such a mirror can be obtained if two adjacent high transmission peaks A and B in FIG. 1 are moved closer to each other, thereby eliminating the undesired transmission minimum at C. This is achieved by depositing a dielectric material having an intermediate refractive index $n_{H1} \approx 1.55$–$1.58$ for the third layer as well as for the q-2 layer in the mirror. For example, FIG. 5 illustrates a mirror having q dielectric layers of alternating high (H) and low (L) refractive indices. The third layer and the q-2 layer have an associated intermediate refractive index of ≈1.55–1.58. FIG. 6 illustrates a transmission characteristic associated with this mirror structure resulting in a broader transmission band around wavelength $\lambda_1$ (≈1310 nm).

Figure 7:
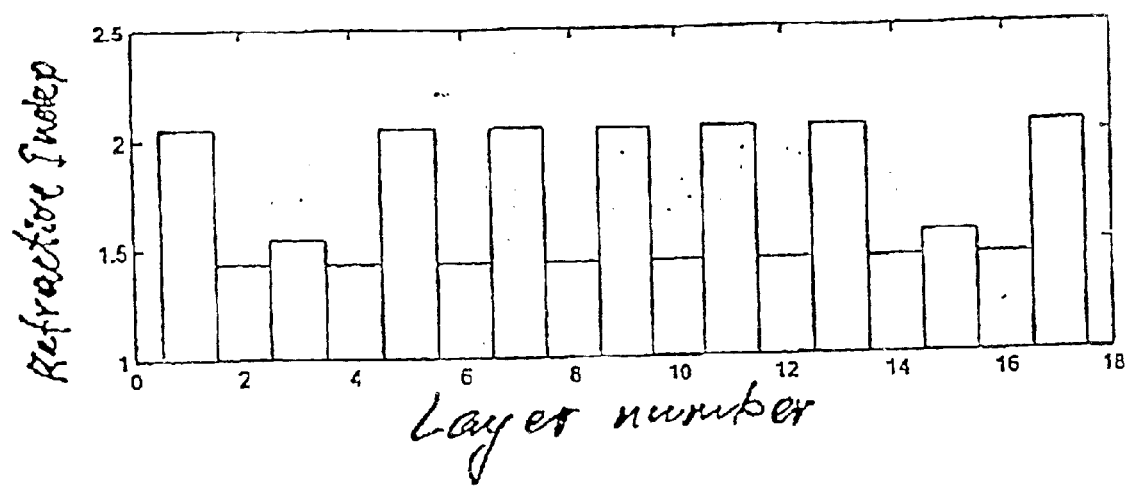
FIG. 7 illustrates the refractive index of each of the layers of an exemplary mirror utilizing the structure described in FIG. 5.

FIG. 7 graphically illustrates the refractive index of each of 17 layers (q=17) of an exemplary mirror utilizing the structure described with reference to FIGS. 5 and 6. $Ta_2O_5$ ($n_H$≈2.05) was selected as the high refractive index material for layers 1, 5, 7, 9, 11, 13 and 17. $SiO_2$ ($n_H$≈1.44) was selected as the low refractive index material for layers 2, 4, 6, 8, 10, 12, 14 and 16. Layers 3 and 15 have refractive index $n_{H1}$=1.58. Layers 3 and 15 may be deposited either by a properly ratioed co-deposition of high and low index materials, or by depositing materials having a refractive index of 1.58 (e.g., mullite, which is a mixture of 76–80% of $Al_2O_3$ and 20–24% of $SiO_2$).

Figure 8:
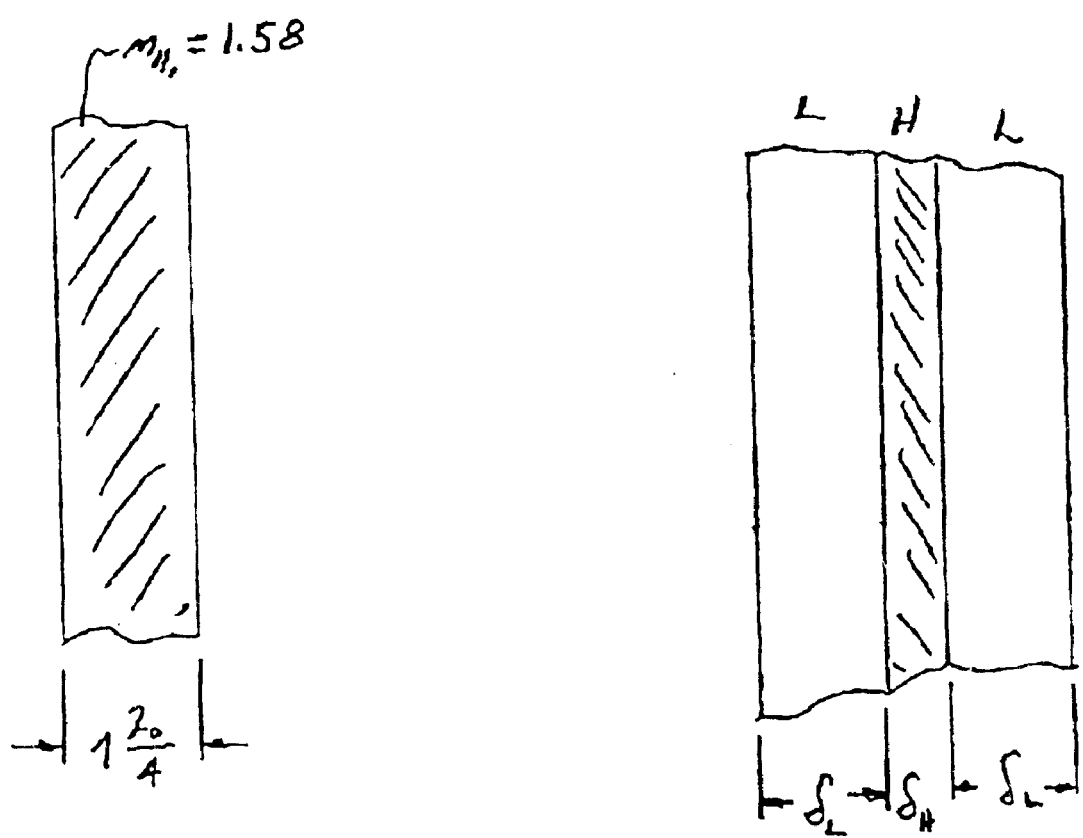
FIG. 8 illustrates a composite dielectric layer.

The interference filter described above with respect to FIG. 7 may use the deposition of a third material having an intermediate refractive index value in the range of 1.55–1.58 with respect to the high and low refractive index materials forming each mirror. However, the introduction of this third material into the deposition process is less desirable from a manufacturing perspective. Accordingly, the third material having an intermediate refractive index used to form layers 3 and q-2 (e.g. layers 3 and 15 referenced in FIG. 7) of an exemplary mirror can be formed by a symmetrical composite layer of high index material (e.g., $Ta_2O_5$, $n_H$≈2.05) clad by a pair of low index material layers (e.g., $SiO_2$, $n_L$≈1.44) as schematically shown in FIG. 8.

This composite material has an optical thickness of one quarter wave at $\lambda_0$, and its effective refractive index is 1.58. If $\delta_H$ represents the optical thickness (in quarter waves at $\lambda_0$) of the thin high index layer comprising the composite, the optical thicknesses $\delta_L$ of the low index material can be calculated as follows:

$$\delta_L = \frac{1}{\pi} \arctan\left(\frac{2n_H \times n_L}{(n_H^2 + n_L^2) \tan\left(\frac{\pi \delta_H}{2}\right)}\right) \quad (3)$$

The resulting structure has an optical thickness of one quarter wave at $\lambda_0$ and allows the use of turning point monitoring for quarter waves during layer deposition. It should be noted that, due to the fact that intermediate value of the refractive index of layers 3 and q-2 in FIG. 7 is close to the value of the low refractive index L, the optical thickness of the inner layer of the composite layer substituting for the layer with the intermediate refractive index tends to be low and close to zero. Consequently, the relatively thin layer can be eliminated and the optical thickness of both adjacent layers can be increased to have an optical thickness of 1.5 times a quarter wave to form a single continuous layer having an optical thickness of ¾ wave, with little harm to the quality of the broad transmission band around $\lambda_1$.

Demanding DWDM applications imply stringent specification on squareness of the shape of the interference filter spectrum, which often requires a filter design having more than three cavities. However, simple designs discussed above in regard to FIG. 3 may not work satisfactorily for cavity counts beyond three. The design of the multi-cavity interference filter with tightly specified shape, bandwidth, and band pass ripple can be based on well known design of microwave half wave filters. The microwave half wave filter theory can provide the value of reflectivity of multilayer dielectric mirrors comprising the interference filter necessary to produce the equal ripple Chebyshev type filter shape. The realization of the two material dielectric mirror with prescribed reflectivity in the first approximation call for a certain number of dielectric layers. The exact value of the reflectivity can be achieved only if at least one of the layers is allowed to have the intermediate value of the refractive index.

To design the interference filter having b road transmission band around $\lambda_1$ and a tight shape, we can use the dielectric mirrors with the prescribed reflectivity and the above mentioned composite layer being degenerated into ¾ wave layers. The layer (or layers) with the intermediate refractive index required to produce exactly the prescribed value of the mirror reflectivity can be placed at least deeper in the stack than a ¾ wave layer to minimize the distortion of the phase of the reflected wave. The location of the layer(s) with the intermediate refractive index within the stack and between the ¾ wave layers can be optimized to further improve the transmission of the mirror around $\lambda_1$. The quality of the transmission of the mirror around $\lambda_1$ can also be improved by optimizing the values of the intermediate refractive indices of the layers if more than one of them is used to precisely tune the reflectivity of the mirror.

And, as it wave illustrated above, every layer with the intermediate refractive index located between ¾ wave layers within the stack can be replaced by the corresponding composit layer, eliminating the need for more than two dielectric materials.

Figure 9:
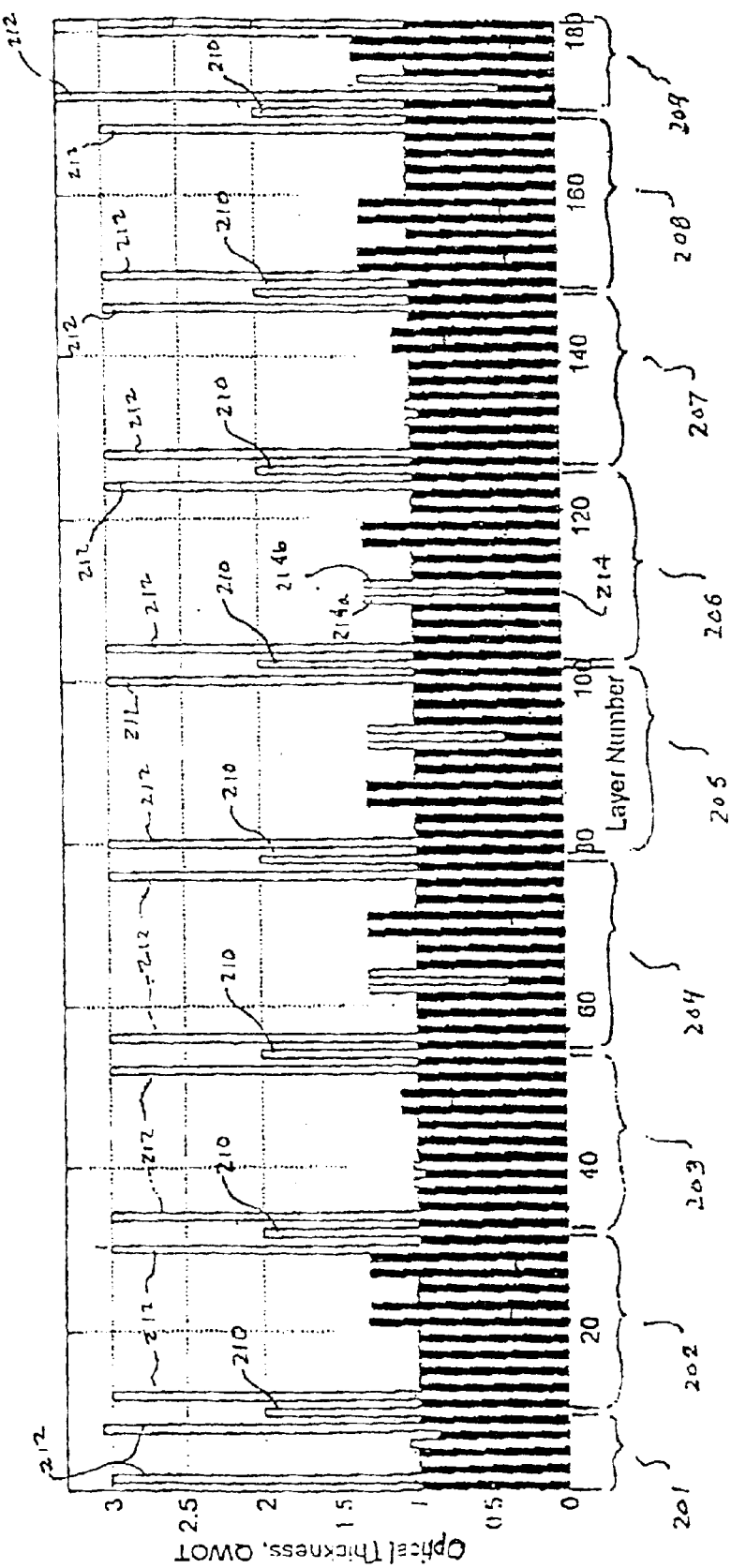
FIG. 9 illustrates the arrangement of the dielectric layers in an exemplary optical interference filter.

FIG. 9 is depicts an exemplary eight cavity, multi-channel filter which transmits six payload channels and a service channel. FIG. 9 illustrates quarter wave optical thickness (QWOT) for each layer of the filter. The filter includes a plurality of mirrors 201–209 each joined by a spacer 210 having an optical thickness of $2\lambda/4$. Each mirror 201–209 is made up of a number of dielectric layers having indices of refraction that alternate between high and low. In an exemplary embodiment, the high index of refraction is 2.069 (depicted by dark layers) and the low index of refraction is 1.469 (depicted by light layers). Each mirror is similar to that shown in FIG. 7, but the third and q-2 layers in FIG. 7 are modified to have the low index of refraction and an optical thickness of $\lambda/4$. Thus, layers 2 to 4 and layers q-2 to q in FIG. 7 are all low index of refraction layers. These three adjacent layers result in boundary layers 212 in FIG. 9 having an optical thickness of $3\lambda/4$.

Figure 10A:
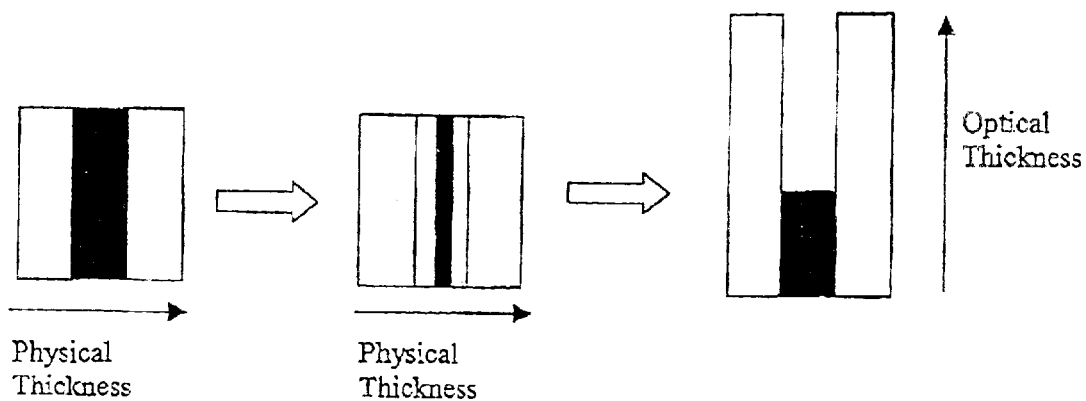
FIGS. 10A and 10B illustrate replacing a dielectric layer with a composite dielectric layer.
Figure 10B:
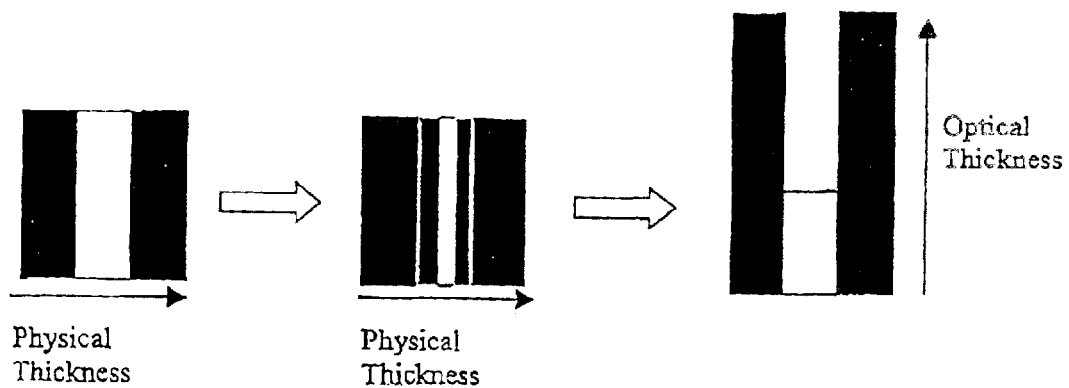

To compensate for the reduction in the index of refraction in the $3^{rd}$ and q-2 layers, the optical thickness of one or more layers in the mirror is adjusted. As described above, the $3^{rd}$ and q-2 layers had an intermediate index of refraction between the low index of refraction and the high index of refraction. The elimination of this intermediate index of refraction is compensated for in other layers of the mirror. A dielectric layer having a high index of refraction may be replaced by a composite layer, similar to that shown in FIG. 8. Such a replacement is depicted in FIG. 10A. Such a replacement results in an increase in the optical thickness of the low index of refraction material and a decrease in the optical thickness of the high index of refraction material. This is shown, for example, in mirror 201, where dielectric layers 5 and 7 of low index of refraction material have increased optical thickness and dielectric layer 6 of high index of refraction material has decreased optical thickness. The opposite scenario is shown in FIG. 10B where a dielectric layer of low index of refraction is replaced by a composite layer. This is shown, for example, in mirror 202 where dielectric layers 22 and 24 of high index of refraction material are increased in optical thickness and dielectric layer 24 of low index of refraction material is decreased in optical thickness. The use of a composite layer results in dielectric layers having a non-integer quarter wave optical thickness.

The determination of which dielectric layer to be replaced with a composite layer may be performed by an optimization routine that determines which dielectric layers in a mirror are to be modified. The required reflectivity of each mirror is established based on the number of cavities and microwave half-wave filter theory applied to produce an equal ripply Chebyshev type filter shape. Typically, all the dielectric layers between boundary layers 212 have an optical thickness of λ/4. The routine determines how to adjust the optical thickness of the dielectric layers so that the predetermined mirror reflectivity is maintained and transmission of a predetermined wavelength (e.g., 1310 nm) is optimized. It is understood that physical constraints of the dielectric layers may prevent an absolute optimum design from being obtained and thus the routine is described as enhancing transmission at the predetermined wavelength.

The routine is performed for each mirror 201–209 individually and may be implemented using a general-purpose computer programmed to carry out the steps described herein. The filter is modeled by the computer and the routine adjusts the model and determines transmission at the predetermined wavelength upon each adjustment. The routine first sequentially replaces each dielectric layer between the two boundary layers 212 in each mirror with a composite layer so that the reflectivity of the mirror is maintained. Transmission at the predetermined wavelength is determined for each replacement. The routine then replaces two dielectric layers between the two boundary layers 212 with composite layers. Different combinations of dielectric layers are replaced with composite layers (e.g., layer 3 and layer 5; layer 3 and layer 6, etc). Any number of layers may be replaced, but it has been found that replacing more than two layers does not enhance performance. The composite layers are selected so that predefined reflectivity of the mirror is maintained. Again, the transmission at the predetermined wavelength is determined for each replacement. The replacement yielding the highest transmission at the predetermined wavelength is selected as the enhanced solution. This replacement enhances the mirror transmission at the predetermined wavelength while maintaining the predetermined reflectivity. The routine is then repeated for each mirror so that the entire filter has enhanced transmission at the predetermined wavelength.

The above-described routine may be described as deviating the optical thickness of one or more layers from a standard or benchmark value. The common optical thickness for each layer of an interference filter is λ/4. The routine alters the optical thickness of at least one dielectric layer from this standard value to enhance transmission at a predetermined wavelength while still maintaining a predefined reflectivity. This results in at least one layer having a non-integer quarter wave optical thickness as shown in FIG. 9.

In an alternate embodiment, one or more layers between boundary layers 212 is replaced with a layer of intermediate index of refraction material having an optical thickness of λ/4. As described above, the intermediate index of refraction is between the high index of refraction and the low index of refraction. Again, an optimization routine is used to determine which layers are replaced to enhance transmission at wavelength $\lambda_1$ while maintaining the predefined mirror reflectivity. Any number of layers may be replaced with an intermediate index of refraction layer.

Figure 11:
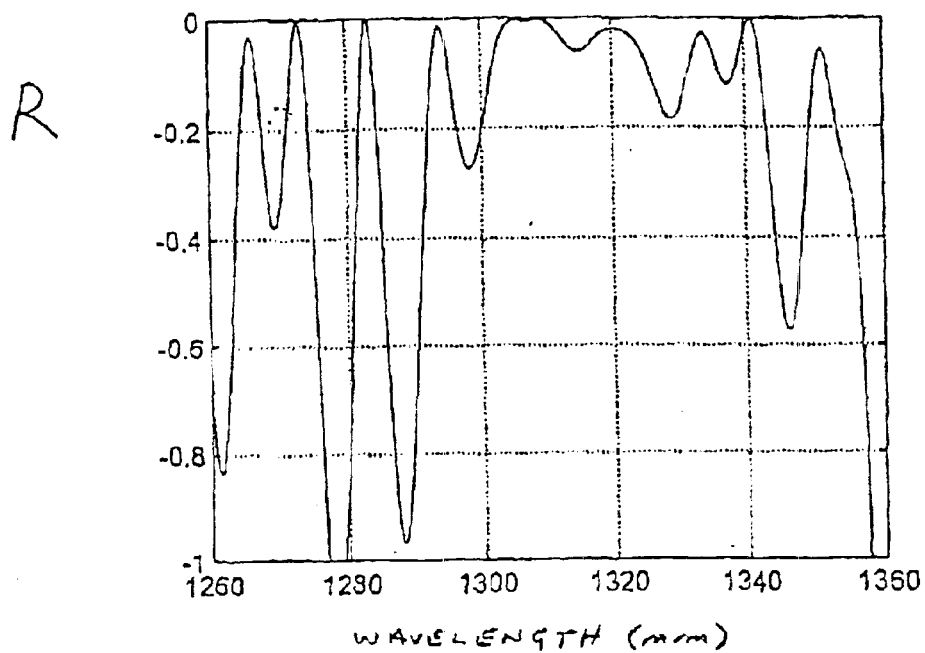
FIG. 11 is a plot of reflectance around a service channel wavelength for the filter of FIG. 9.

FIG. 11 is a plot of reflectance (R) for the filter of FIG. 9 for wavelengths around the service channel wavelength of 1310 nm. It is understood that the service channel may be implemented on other wavelengths. As shown in FIG. 11, reflectance is substantially zero at 1310 nm.

Figure 12:
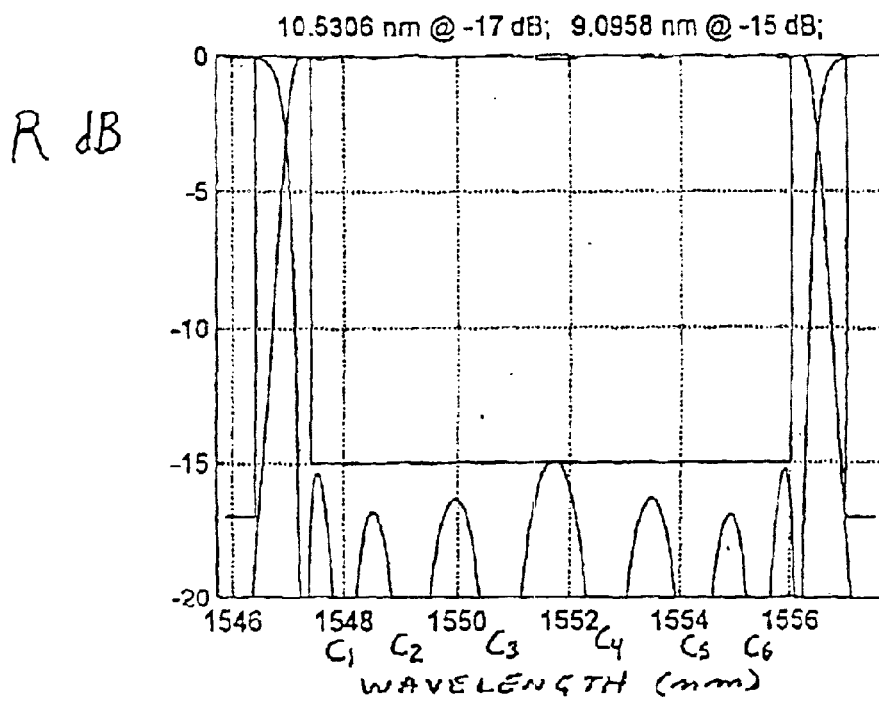
FIG. 12 is a plot of reflectance around payload channel wavelengths for the filter of FIG. 9.

FIG. 12 is a plot of reflectance (R) in dB for payload channels. The filter of FIG. 9 provides a number of transmission bands (i.e., bands having low reflectance) labeled $C_1$–$C_6$ in FIG. 12. These transmission bands may correspond to six payload channels. An exemplary application of the filter of FIG. 9 is to pass six payload channels and a service channel in a wave-division multiplexed optical communications system. It is understood that the filter may include any number of cavities and may be used for a variety of applications. Thus, the invention is not limited to optical filters for transmitting six payload channels.

Figure 13:
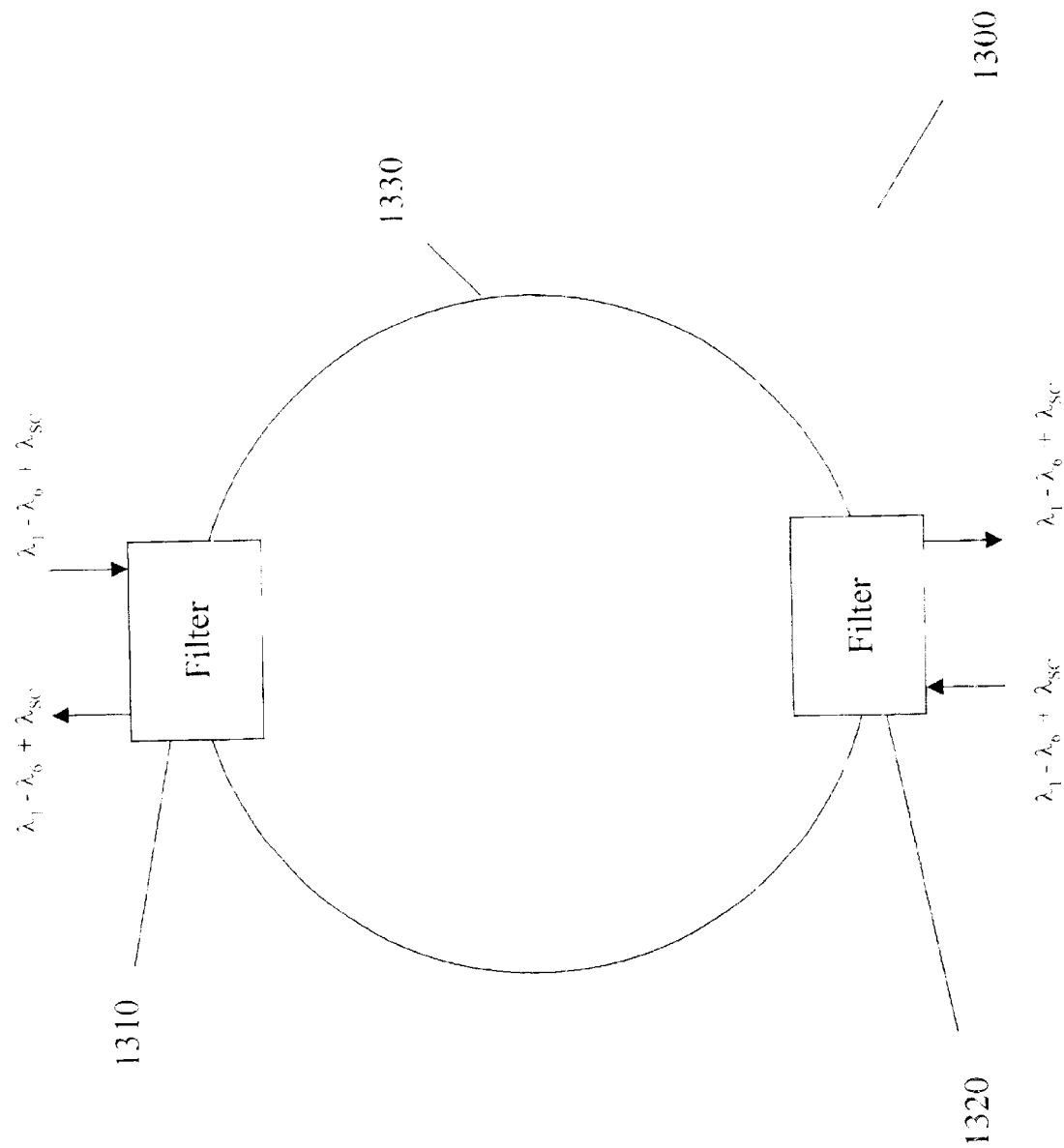
FIG. 13 illustrates an optical communication system incorporating filters consistent with the present invention.

FIG. 13 illustrates an alternative embodiment of the present invention in which filters similar to that discussed above are incorporated into a communication system 1300. In particular, filters 1310 and 1320 are provided along a continuous optical path 1330, and are configured to add/drop six channels ($\lambda_1$–$\lambda_6$) and a service channel ($\lambda_{SC}$) Channels $\lambda_1$–$\lambda_6$ often carry user data such as telephone calls and internet traffic, while the service channel carries monitoring, control and diagnostic information concerning system 1300. Channel $\lambda_1$–$\lambda_6$ are typically at wavelengths located within a narrow range about 1550 nm (the absorption minimum of silica fibers), while the service channel can be at a wavelength spectrally spaced therefrom, such as 1300 nm. Alternatively, the service channel wavelength can be within a range of 1625 nm to 1650 nm, inclusive of these wavelengths. It is understood that additional filters can be provided along optical communication path 1330 for adding/dropping channel groupings, if necessary.

System 1300 includes a filter component that can add or drop a plurality of user channels and a service channel, instead of using multiple filters for adding and dropping individual channels. Accordingly, system 1300 incurs less loss and has improved signal quality over conventional systems incorporating single channel add/drop filters.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. An optical communication device, comprising:
an optical communication path; and
a plurality of optical filtering elements coupled to said optical communication path, each of said plurality of filtering elements having a single optical interference filter that includes a plurality of alternating high and low refractive indices and has two passbands, a first passband being configured to add/drop a plurality of optical signals corresponding to an optical payload channel, each of the optical signals being at a respective one of a plurality of wavelengths, the first passband being a approximately 1 nm wide around a first center wavelength within said plurality of wavelengths of said optical signals;
a second passband of said optical interference filter being configured to add/drop a service channel at a wavelength different than the plurality of wavelengths of the optical signals, the second passband being aproximately 20 nm wide around a second center wavelength corresponding to said service channel wavelength.

2. An optical communication device in accordance with claim 1, wherein said optical communication path is a continuous optical communication path.

3. The optical communication device of claim 1, wherein the optical payload channels are separated by a channel spacing.

4. The optical communication device of claim 3, wherein the plurality of optical payload channels is comprised of six optical payload channels.

5. The optical communication device of claim 4, wherein each of said six optical payload channels has a center wavelength within a range of 1530 nm to 1570 nm.

6. The optical communication device of claim 1, wherein the service channel has a center wavelength within a range of 1625 nm to 1650 nm.

7. The optical communication device of claim 1, wherein the service channel has a center wavelength of 1310 nm.

8. An optical communication device, comprising:

an optical communication path, said optical communication path being configured to carry a plurality of optical signals, each at a respective on of a plurality of wavelengths, and a service channel optical signal at a wavelength different than said plurality of wavelengths; and an optical interference filter coupled to said optical communication path, said optical interference filter including a plurality of alternating high and low refractive indices and being configured to select by a first passband a grouping of said plurality of optical signals and by a second passband said service channel optical signal, said first passband being aproximately 1 nm wide around a first center wavelength within said plurality of wavelengths of said plurality of optical signals, and said second passband being aproximately 20 nm wide around a second center wavelength corresponding to said wavelength of said service channel.

9. An optical communication device in accordance with claim 8, wherein said first center wavelength of said plurality of wavelengths is within a range of 1530 nm to 1570 nm, and said wavelength of said service channel optical signal being spectrally spaced from said plurality of wavelengths.

10. An optical communication device in accordance with claim 9, wherein said second center wavelength of said service channel is substantially equal to 1310 nm.

11. An optical communication device in accordance with claim 9, wherein said second center wavelength of said service channel is within a range of and including 1625 nm to 1650 nm.

12. The optical communication device of claim 8, wherein said grouping of said plurality of optical signals is comprised of six payload channels.

13. The optical communication device of claim 12, wherein the six payload channels are spaced apart by a predetermined channel spacing.

* * * * *